United States Patent
Goldfarb et al.

(10) Patent No.: US 9,929,920 B2
(45) Date of Patent: *Mar. 27, 2018

(54) SYSTEM AND METHOD FOR EFFICIENT CLASSIFICATION AND PROCESSING OF NETWORK TRAFFIC

(71) Applicant: Verint Systems Ltd., Herzliya Pituach (IL)

(72) Inventors: Eithan Goldfarb, Ness Ziona (IL); Yuval Altman, Herzeliya (IL); Naomi Frid, Modi'in (IL); Gur Yaari, Tel Aviv (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 74 days.

This patent is subject to a terminal disclaimer.

(21) Appl. No.: 14/989,075

(22) Filed: Jan. 6, 2016

(65) Prior Publication Data

US 2016/0197796 A1    Jul. 7, 2016

Related U.S. Application Data

(63) Continuation of application No. 13/358,477, filed on Jan. 25, 2012, now Pat. No. 9,264,446.

(30) Foreign Application Priority Data

Jan. 27, 2011    (IL) .......................................... 210900

(51) Int. Cl.
*H04L 12/26*    (2006.01)
*H04L 29/06*    (2006.01)

(52) U.S. Cl.
CPC ............ *H04L 43/026* (2013.01); *H04L 43/04* (2013.01); *H04L 63/0227* (2013.01);
(Continued)

(58) Field of Classification Search
CPC ... H04L 43/026; H04L 43/04; H04L 63/0227; H04L 63/1416; H04L 63/1441; H04L 63/30; H04L 63/306
See application file for complete search history.

(56) References Cited

U.S. PATENT DOCUMENTS 5,689,442 A    11/1997    Swanson et al.
6,404,857 B1    6/2002    Blair et al.
(Continued)

FOREIGN PATENT DOCUMENTS

| EP | 1873992 | 1/2008 |
| EP | 2164228 | 3/2010 |
| WO | 2004/088942 | 10/2004 |

OTHER PUBLICATIONS

Altshuler, Y., et al., "How Many Makes a Crowd? On the Evolution of Learning as a Factor of Community Coverage," LNCS 7227, 2012, pp. 43-52.
(Continued)

*Primary Examiner* — Abdullahi E Salad
(74) *Attorney, Agent, or Firm* — Meunier Carlin & Curfman

(57) ABSTRACT

Methods and systems for analyzing flows of communication packets. A front-end processor associates input packets with flows and forwards each flow to the appropriate unit, typically by querying a flow table that holds a respective classification for each active flow. In general, flows that are not yet classified are forwarded to the classification unit, and the resulting classification is entered in the flow table. Flows that are classified as requested for further analysis are forwarded to an appropriate flow analysis unit. Flows that are classified as not requested for analysis are not subjected to further processing, e.g., discarded or allowed to pass.

12 Claims, 1 Drawing Sheet

(52) U.S. Cl.
CPC ...... *H04L 63/1416* (2013.01); *H04L 63/1441* (2013.01); *H04L 63/30* (2013.01); *H04L 63/306* (2013.01)

(56) References Cited

U.S. PATENT DOCUMENTS

| | | | |
|---|---|---|---|
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 8,392,421 | B1 | 3/2013 | Nucci et al. |
| 2002/0099854 | A1* | 7/2002 | Jorgensen ............... H04L 1/20 709/249 |
| 2003/0086422 | A1 | 5/2003 | Klinker et al. |
| 2004/0205360 | A1 | 10/2004 | Norton et al. |
| 2005/0044406 | A1 | 2/2005 | Stute |
| 2006/0075093 | A1* | 4/2006 | Frattura ............. H04L 41/0681 709/224 |
| 2007/0011734 | A1 | 1/2007 | Balakrishnan et al. |
| 2008/0014873 | A1 | 1/2008 | Krayer et al. |
| 2008/0163333 | A1 | 7/2008 | Kasralikar |
| 2008/0261192 | A1 | 10/2008 | Huang et al. |
| 2008/0285464 | A1 | 11/2008 | Katzir |
| 2010/0042565 | A1 | 2/2010 | Akerman |
| 2010/0158009 | A1* | 6/2010 | Lee ..................... H04L 47/2441 370/392 |
| 2011/0019574 | A1* | 1/2011 | Malomsoky ........ H04L 41/5022 370/252 |
| 2011/0231564 | A1* | 9/2011 | Korsunsky ............. G06F 21/55 709/231 |
| 2012/0079101 | A1* | 3/2012 | Muppala ............ H04L 47/2441 709/224 |

OTHER PUBLICATIONS

Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Aho, Alfred V., et al., "Efficient String Matching: An Aid to Bibliographic Search," Communication of the ACM, Jun. 1975, vol. 18, No. 6, pp. 333-340.
Atkinson, M., et al., "Near Real Time Information Mining in Multilingual News," World Wide Web Conference, Apr. 20-24, 2009, 2 pages.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Corney, M., et al. "Gender-Preferential Text Mining of E-mail Discourse," Proceedings of the 18the Annual Computer Security Applications Conference, 2002, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
De Vel, O., et al., "Language and Gender Author Cohort Analysis of E-mail for Computer Forensics," Defense Science and Technology Organisation, Australia, 2002, 16 pages.
Eagle, N., et al., "Inferring friendship network structure by using mobile phone data," PNAS, vol. 106, No. 36, 2009, pp. 15274-15278.

Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Lakhina, A., et al., "Mining Anomalies Using Traffic Feature Distributions," SIGCOMM, 2005, pp. 217-228.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.

(56) References Cited

OTHER PUBLICATIONS

Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.
European Search Report, dated Apr. 2, 2012, received in connection with European Patent Application No. 12152448.

\* cited by examiner

SYSTEM AND METHOD FOR EFFICIENT CLASSIFICATION AND PROCESSING OF NETWORK TRAFFIC

CROSS-REFERENCE TO RELATED APPLICATIONS

This application is a continuation of, and claims the benefit of priority to, U.S. patent application Ser. No. 13/358,477, filed Jan. 25, 2012, the disclosure of which is incorporated herein by reference in its entirety.

FIELD OF THE DISCLOSURE

The present disclosure relates generally to packet processing, and particularly to methods and systems for analyzing flows of communication packets.

BACKGROUND OF THE DISCLOSURE

Communication packet inspection techniques are used in a wide variety of applications. For example, in some applications, communication packets are analyzed in an attempt to detect communication traffic of interest. Some data security systems inspect packets in order to detect information that leaks from an organization network. Some firewalls and intrusion detection systems inspect packets in order to identify illegitimate intrusion attempts or malicious traffic. Packet inspection systems are produced, for example, by Cloudshield Technologies (Sunnyvale, Calif.) and Ipoque (Leipzig, Germany).

SUMMARY OF THE DISCLOSURE

An embodiment that is described herein provides a system including multiple flow analysis units, at least one classification unit and a front-end processor. The flow analysis units are configured to analyze flows of communication packets. The classification unit is configured to accept one or more of the communication packets in a flow and to classify the flow so as to determine whether the flow is to be analyzed by the flow analysis units. The front-end processor is configured to receive input packets from a communication network, to associate each input packet with a respective input flow, to forward at least one input flow to the classification unit for classification, and to forward one or more input flows, which were classified by the classification unit as requested for analysis, to the flow analysis units.

In some embodiments, the front-end processor is configured to choose, for a given input flow, whether to forward the given input flow to the flow analysis units, to forward the given input flow to the classification unit or to refrain from processing the given input flow, based on a respective classification of the given input flow that was specified by the classification unit. In an embodiment, the classification unit is configured to classify a given input flow based on less than 5% of the input packets belonging to the given input flow.

In another embodiment, the classification unit is configured to classify a first input flow based on information produced in classifying a second input flow. In a disclosed embodiment, the classification unit is configured to identify a server-side address and a client-side address in the second input flow, and to use the identified server-side and client-side addresses in classifying the first input flow.

In another embodiment, the front-end processor is configured to maintain a list of active input flows and respective classifications of the active input flows, and to forward the input flows to the flow analysis units based on the classifications of the input flows on the list. The front-end processor may be configured to forward a given input flow to the classification unit responsively to identifying in the list that the given input flow has not yet been classified, and to update the list with a respective classification of the given input flow that was produced by the classification unit.

In some embodiment, the classification unit is configured to identify an application that is served by a given input flow, and to classify the given input flow based on the identified application. In an embodiment, the at least one classification unit includes multiple classification units, and the front-end processor is configured to distribute multiple input flows for classification among the classification units.

There is additionally provided, in accordance with an embodiment that is described herein, a method including receiving input packets from a communication network and associating each input packet with a respective input flow. At least one input flow is forwarded to a classification unit for classification. One or more input flows, which were classified by the classification unit as requested for analysis, are forwarded to multiple flow analysis units so as to cause the flow analysis units to analyze the requested flows.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and systems for analyzing flows of communication packets. The disclosed techniques use a highly efficient and scalable system configuration comprising a front-end processor (also referred to as fast-path processor), at least one classification unit, and a number of flow analysis units.

The front-end processor associates input packets with flows and forwards each flow to the appropriate unit, typically by querying a flow table that holds a respective classification for each active flow. In general, flows that are not yet classified are forwarded to the classification unit, and the resulting classification is entered in the flow table. Flows that are classified as requested for further analysis are forwarded to an appropriate flow analysis unit. Flows that are classified as not requested for analysis are not subjected to further processing, e.g., discarded or allowed to pass.

The disclosed system configurations are highly modular, efficient and scalable, and are particularly useful in applications that process large numbers of packet flows simultaneously. By using the disclosed techniques, analysis resources can be allocated efficiently without wasting resources on low-priority or unimportant flows. In an example embodiment, the system is able to receive and classify input traffic with throughput on the order of 40-200 Gbps, while the flow analysis units actually process only several percent of this input throughput.

By using multiple flow analysis units, and optionally multiple classification units, traffic load can be balanced among the units and processed in parallel. The methods and systems described herein can be used in a variety of flow processing applications, such as data leakage prevention, intrusion detection and/or prevention and lawful interception.

System Description

Figure 1:
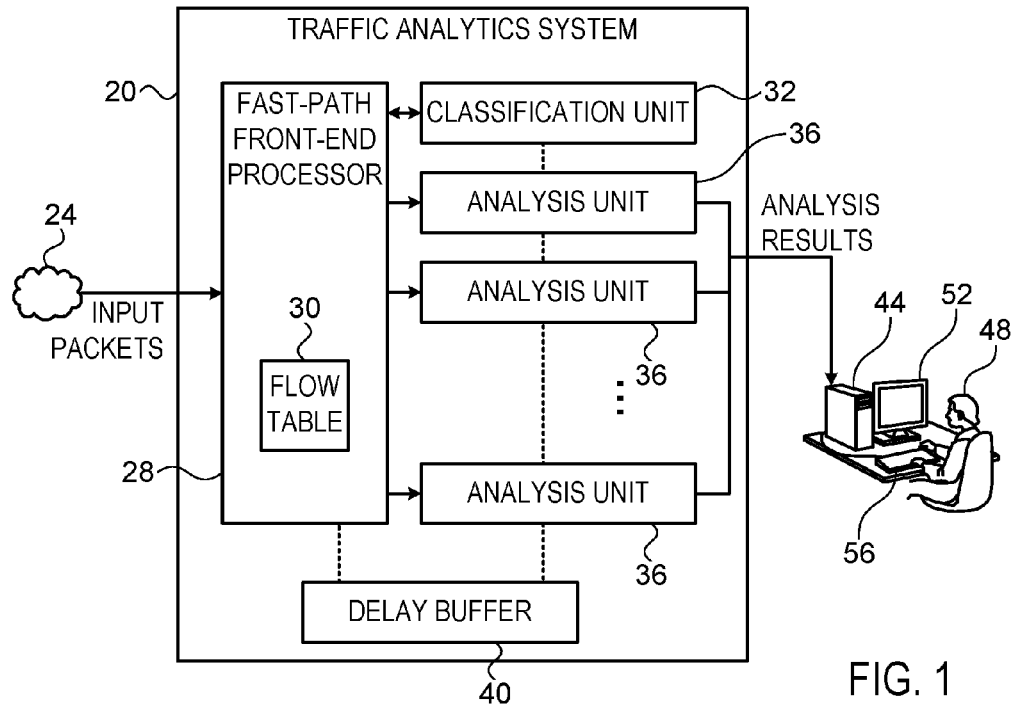
FIG. 1 is a block diagram that schematically illustrates a traffic analytics system, in accordance with an embodiment that is described herein.

FIG. 1 is a block diagram that schematically illustrates a traffic analytics system 20, in accordance with an embodiment that is described herein. System 20 may be used in any suitable application that analyzes packet flows. For example, system 20 may comprise a firewall, a Data Leakage Prevention (DLP) system, an Intrusion Detection System (IDS), an Intrusion Prevention System (IPS) or a Lawful Interception (LI) system.

System 20 receives communication packets from a communication network 24, classifies the packets into flows, and applies certain actions to the flows. The term "packet flow" or "flow" is used to describe any sequence of packets that carries application data between endpoints. A given flow is typically identified by a specific combination of packet attributes. Flows can be unidirectional or bidirectional. Flows can be defined at various granularities, depending on the choice of packet attributes.

In some embodiments, system 20 monitors the packet flows that are communicated between network 24 and another communication network (not shown) and applies various actions to these flows. The two networks typically comprise Internet Protocol (IP) networks. In an example DLP application, network 24 comprises an enterprise or organizational network, the other network comprises the Internet, and system 20 selectively blocks flows containing material that is not permitted to exit network 24. In an example firewall or IPS application, network 24 comprises the Internet, the other network comprises an enterprise or organizational network, and system 20 selectively blocks illegitimate packet flows, e.g., flows containing illegitimate or malicious content, from entering the other network. In an example LI application, system 20 monitors the packets communicated in network 24, and selectively sends packet flows of interest for further analysis, e.g., to a monitoring center or other system.

System 20 comprises a front-end processor 28, at least one classification unit 32, and multiple flow analysis units 36. Front end processor 28, which is also referred to as a fast-path processor, receives input packets from network 24 and associates each input packet to a respective flow. Processor 28 then forwards the packets of each flow to the appropriate unit (classification or analysis unit) for subsequent processing.

Front-end processor 28 typically forwards flows that are not yet classified to classification unit 32. Unit 32 classifies a given flow to one of several possible classifications, and indicates the specified classification to front-end processor 28. The front-end processor decides to which unit to forward each flow based on the flow classification.

Flow analysis units 36 may carry out various analytics functions with respect to the flows. For example, a given analysis unit may comprise a keyword spotting unit that searches packet flows for occurrences of keywords or key phrases. Analysis results of this unit may comprise, for example, indications as to the locations of the identified keyword occurrences in the flow, and the actual media content of the flow in the vicinity of the occurrences.

As another example, an analysis unit may search for occurrences of regular expressions in flows. Searching for regular expressions can be useful, for example, for identifying telephone numbers and credit card numbers in DLP applications, or for detecting known attack patterns in intrusion detection and prevention applications. Since regular expression searching is often computationally intensive, applying such a search only to selected flows or parts of flows may provide a considerable improvement in overall system performance.

Another example analysis unit may comprise a "Man in the Middle" (MiTM) decryption unit, which decrypts encrypted data that is carried by packet flows. Analysis results of this unit may comprise, for example, the decrypted traffic.

As yet another example, an analysis unit may carry out stream-based scanning for viruses or other malicious software or content. Anti-malware products of this sort are provided, for example, by Kapersky Lab (Moscow, Russia). Additionally or alternatively, units 36 may apply any other suitable analytics functions to the packet flows. System 20 may comprise any desired number of flow analysis units of any desired type.

Typically, front-end processor 28 maintains a flow table 30 that holds a respective entry for each active flow. The entry of each flow in table 30 indicates a combination of packet attributes (sometimes referred to as a "tuple" or a key) that identifies packets with the flow. Packet attributes used for associating packets with flows may comprise, for example, source and/or destination Medium Access Control (MAC) addresses, source and/or destination IP addresses, port number, Virtual Local Area Network (VLAN) tags and/or any other suitable attribute.

In addition, the entry of each flow in table 30 holds a classification of the flow, as specified by classification unit 32. Each flow may be assigned various kinds of classification, e.g., "unclassified," "requested for further analysis," "not requested for further analysis," "requested for forwarding to a monitoring center," "requested for long-term storage," "requested for further analysis by an analysis unit of type X," or any other suitable classification that indicates the subsequent handling of the flow. In some embodiments, the classification of a given flow as requested or not requested for analysis is derived from a set of interception rules. Front-end processor 28 chooses where to forward each flow based on the classification that appears in the flow table entry of that flow.

In a typical mode of operation, front-end processor receives incoming packets from network 24, and associates each packet with a respective flow using the packet attributes maintained in flow table 30. If a packet does not match any of the active flows in table 30, processor 28 may define a new flow in the table. A new flow is initially defined as "unclassified" in the flow table.

Processor 28 queries table 30 in order to decide where to forward each flow. If a given flow is defined as unclassified, processor 28 forwards its packets to classification unit 32. The classification unit classifies the flow, for example to one of the above-described classifications, and reports the classification to front-end processor 28. The front-end processor then updates the flow table entry of the flow with the reported classification. For a flow that is already classified by unit 32, processor 28 forwards the flow to the appropriate analysis unit 36, as specified in the classification of the flow. In some embodiments, a certain classification may request processor 28 to forward the flow to a monitoring center (not shown).

In some embodiments, classification unit 32 also identifies the application served by each flow. Unit 32 may identify, for example, whether a given flow carries an Internet browsing session that uses Hyper Text transfer Protocol (HTTP), an e-mail session using a certain e-mail application, a Peer-to-Peer (P2P) session, an Instant Messaging (IM) session, an encrypted session that uses the Secure Socket Layer (SSL) protocol, or any other suitable application. In these embodiments, classification unit 32 reports the identified application type to front-end processor 28. Processor 28 may use the identified application types in deciding to which analysis unit to forward each flow. Typically, in order to identify the application, processor 28 examines the data content of the packets, and not only the packet header attributes.

Using this technique, each analysis unit attempts to analyze only traffic types to which it is intended, and does not waste analysis resources on other traffic types. For example, processor 28 will typically refrain from forwarding encrypted traffic or video content to keyword spotting analysis units. Using this technique, MiTM decryption units will receive only encrypted traffic, and keyword spotting units will receive only traffic that carries text. Thus, analysis resources can be used with high efficiency.

In some embodiments, system 20 comprises a delay buffer 40 that is used for temporary storage of packets. The delay buffer is typically accessible to front-end processor 28, to flow analysis units 36 and to classification unit 32. In an example embodiment, processor 28 stores packets of unclassified flows in buffer 40, until classification unit 32 classifies them and they can be forwarded to the appropriate analysis unit.

In an embodiment, classification unit 32 is able to classify flows based on a small subset of the packets in the flow. Typically, reliable classification can be achieved based on less than 5% of the packets in the flow (often the first packets that are received by system 20). Since the classification unit requires only a small subset of the packets, delay buffer 40 can be dimensioned accordingly, so as to buffer only the required portion of the packets.

The analysis results of the various analysis units 36 are typically provided to an operator terminal 44 for presentation to an operator 48. The analysis results may be displayed on a display 52 or using any other suitable output device. In some embodiments, operator 48 configures system 20 using a keyboard 56 or other input device. In some embodiments, the functions of operator terminal 44 are implemented as part of the monitoring center. In other embodiments, the monitoring center and operator terminal are implemented separately.

The configuration of system 20 shown in FIG. 1 is an example configuration, which is chosen purely for the sake of conceptual clarity. In alternative embodiments, any other suitable system configuration can also be used. For example, system 20 may comprise two or more classification units 32 that operate in parallel in order to provide small classification delay. Front-end processor 28 may forward unclassified flows to any of the multiple classification units, in accordance with any suitable criterion or policy.

The elements of system 20 may be implemented in hardware, e.g., in one or more Application-Specific Integrated Circuits (ASICs) or Field-Programmable Gate Arrays (FPGAs). Alternatively, some system elements can be implemented using software, or using a combination of hardware and software elements.

In some embodiments, some or all of the disclosed techniques can be carried out using a general-purpose computer, network processor or other processor, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. Example processors may comprise the XLR family produced by NetLogic Microsystems (Santa Clara, Calif.), the OCTEON family produced by Cavium Networks (Mountain View, Calif.), or the MPC8572 processor produced by Freescale Semiconductor (Austin, Tex.).

In some embodiments, front-end processor 28 balances the load among multiple classification units, or among analysis units of the same type, by applying various forwarding criteria based on packet attributes. When the packets are encapsulated in accordance with a certain tunneling or encapsulation protocol (e.g., IP-in-IP or GPRS Tunneling Protocol—GTP), the front-end processor typically balances the load based on the inner IP addresses of the packets.

In some embodiments, classification unit 32 classifies one flow using information that was obtained in classifying another flow. For example, when classifying a certain flow between two IP addresses, the classification unit may identify which IP address acts as a server-side of the flow and which IP address acts as a client-side of the flow. This information may be useful for classifying another flow that involves one or both of these IP addresses. In an example embodiment, the identification of server-side and client-side IP addresses is stored in the entries of flow table 30.

As noted above, front-end processor associates input packets with flows based on a key or tuple. The structure of the key (i.e., the choice of packet attributes used for flow association) may depend, for example, on the type of network 24 and/or the point in network 24 from which the packets are provided to system 20.

Traffic Processing Method Description

Figure 2:
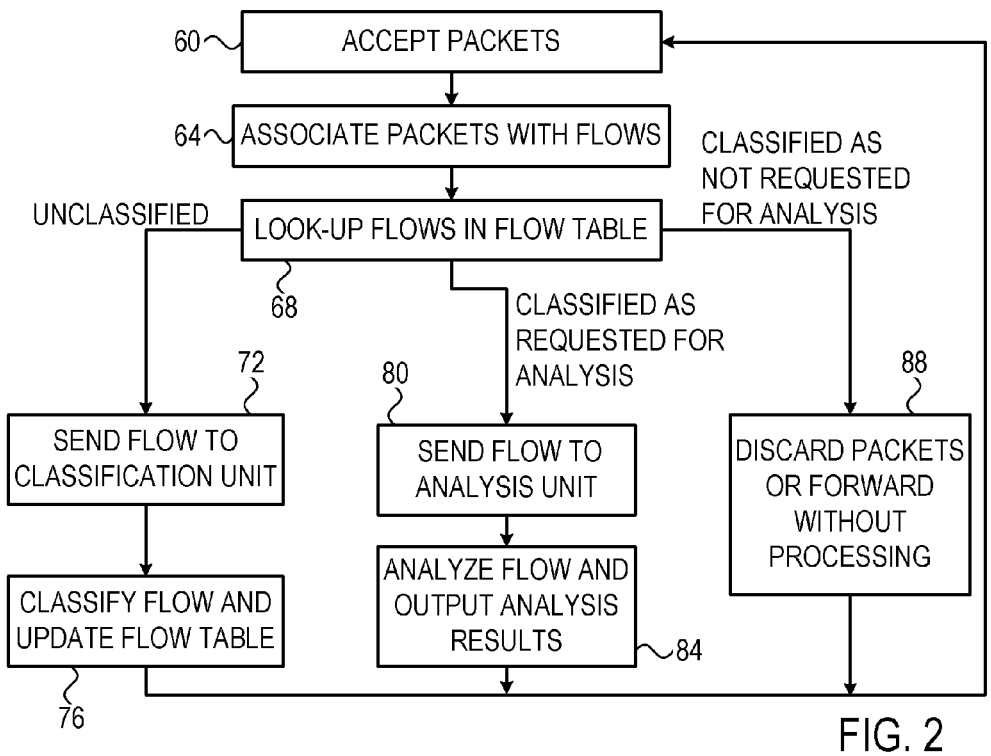
FIG. 2 is a flow chart that schematically illustrates a method for traffic analytics, in accordance with an embodiment that is described herein.

FIG. 2 is a flow chart that schematically illustrates a method for traffic analytics, in accordance with an embodiment that is described herein. The method begins with front-end processor 28 accepting communication packets from network 24, at an input step 60. The front-end processor associates the packets with flows, at a flow association step 64. In order to forward each flow, the front-end processor looks-up flow table 30, at a table lookup step 68.

If, for example, a given flow is defined in table 30 as "unclassified," the front-end processor sends this flow to classification unit 32, at a classification sending step 72. Classification unit 32 classifies the flow and updates flow table 30 accordingly, at a classification step 76. The method loops back to step 60 above. Since the flow table is now updated with a classification of the flow, subsequent packets belonging to this flow will be forwarded to one of the flow analysis units.

If a given flow is defined in table 30 as "requested for subsequent analysis," the front-end processor sends the flow to the appropriate flow analysis unit 36, at an analysis sending step 80. The front-end processor may select the appropriate analysis unit using various criteria. For example, the flow classification may indicate a specific type of analysis unit that should analyze the flow. As another example, if system 20 comprises more than one analysis unit of the requested type, processor 28 may select the analysis unit that is less busy, in order to balance the load among the analysis units.

Additionally or alternatively, processor 28 may select the analysis unit based on the application type used in the flow, as identified by classification unit 32. Further alternatively, any other suitable method can be used for selecting the analysis unit based on the classification of the flow in table 30. The selected analysis unit 36 analyzes the flow, at an analysis step 84. The analysis unit typically sends the analysis results to operator terminal 44.

If a given flow is defined in table 30 as "not requested for subsequent analysis," the front-end processor refrains from sending the flow to any of the analysis units, at an analysis skipping step 88. Front-end processor 28 may allow the flow to pass without further processing (e.g., in in-line applications such as DLP or IPS), or discard the packets of the flow (e.g., in applications where the packets are duplicated and forwarded to system 20, such as some LI applications).

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A system for classifying flows of communication packets from a network, the system comprising:
   a classification processor that receives unclassified input flows of communication packets from a front-end processor and assigns a classification to a given unclassified input flow that indicates whether the input flow is to be analyzed by a flow analysis processor,
   wherein the classification is assigned by the classification processor based on less than 5% of the input packets of the given input flow,
   wherein the classification processor assigns a first classification to a first unclassified input flow that indicates whether the first flow is to be analyzed by the flow analysis processor based on information produced in assigning a second classification to a second unclassified input flow, and
   wherein the classification processor identifies a server-side address and a client-side address in the second input flow, and uses the identified server-side and client-side addresses in assignment of the first classification to the first input flow.

2. The system according to claim 1, wherein the front-end processor is configured to choose, for the given unclassified input flow, whether to forward the given input flow to the flow analysis processor, to forward the given input flow to the classification processor or to refrain from processing the given input flow, based on a respective classification of the given input flow that was specified by the classification processor.

3. The system according to claim 1, wherein the front-end processor is configured to maintain a list of active input flows and respective classifications of the active input flows, and to forward the input flows to the flow analysis processor based on the classifications of the input flows on the list.

4. The system according to claim 3, wherein the front-end processor is configured to forward the given input flow to the classification processor responsively to identifying in the list that the given input flow has not yet been classified, and to update the list with a respective classification of the given input flow that was produced by the classification processor.

5. The system according to claim 1, wherein the classification processor identifies an application that is served by a given input flow, and classifies the given input flow based on the identified application.

6. The system according to claim 1, wherein the at least one classification processor comprises multiple classification processors, and wherein the front-end processor is configured to distribute multiple input flows for classification among the classification processors.

7. A method for classifying flows of communication packets from a network, the method comprising:
   receiving, by a classification processor, unclassified input flows of communication packets from a front-end processor; and
   assigning a classification to a given unclassified input flow, by the classification processor, wherein the classification assigned determines whether the given input flow is to be analyzed by a flow analysis processor, wherein assigning a classification comprises assigning a first classification to a first unclassified input flow, by the classification processor, that indicates whether the first flow is to be analyzed by the flow analysis processor based on information produced in assigning a classification to a second unclassified input flow, wherein assigning the second classification to the second input flow comprises identifying a server-side address and a client-side address in the second input flow, and wherein assigning the first classification to the first input flow is performed using the identified server-side and client-side addresses.

8. The method according to claim 7, further comprising forwarding one or more input flows, which were classified by the classification processor as requiring analysis by the flow analysis processor, to the flow analysis processor so as to cause the flow analysis processor to analyze the requested flows, wherein forwarding the input flows comprises choosing, for a given input flow, whether to forward the given input flow to the flow analysis processor, to forward the given input flow to the classification processor or to refrain from processing the given input flow, based on a respective classification of the given input flow that was specified by the classification processor.

9. The method according to claim 7, further comprising forwarding one or more input flows, which were classified by the classification processor as requiring analysis by the flow analysis processor, to the flow analysis processor so as to cause the flow analysis processor to analyze the requested flows, wherein forwarding the input flows comprises maintaining a list of active input flows and respective classifications of the active input flows, and forwarding the input flows to the flow analysis processor based on the classifications of the input flows on the list.

10. The method according to claim 9, wherein forwarding the input flows comprises forwarding the given input flow to the classification processor responsively to identifying in the list that the given input flow has not yet been classified, and updating the list with a respective classification of the given input flow that was produced by the classification processor.

11. The method according to claim 7, and comprising, in the classification processor, identifying an application that is served by the given input flow and classifying the given input flow based on the identified application.

12. The method according to claim 7, and comprising operating multiple classification processors, wherein forwarding the at least one input flow comprises distributing multiple input flows for classification among the classification processors.

\* \* \* \* \*